US012623297B2

(12) United States Patent (10) Patent No.: US 12,623,297 B2
Schmitz et al. (45) Date of Patent: May 12, 2026

(54) METHOD FOR PRODUCING A THREAD ON AT LEAST ONE END OF AT LEAST ONE METAL TUBE AND THREAD-CUTTING FACILITY

(71) Applicant: SMS group GmbH, Düsseldorf (DE)

(72) Inventors: Jochen Schmitz, Wassenberg (DE); Frank D'Hone, Cologne (DE); Tim Küppers, Nettetal (DE); Helge Dähndel, Mönchengladbach (DE)

(73) Assignee: SMS group GmbH, Düsseldorf (DE)

( * ) Notice: Subject to any disclaimer, the term of this patent is extended or adjusted under 35 U.S.C. 154(b) by 537 days.

(21) Appl. No.: 18/032,954

(22) PCT Filed: Sep. 15, 2021

(86) PCT No.: PCT/EP2021/075267
§ 371 (c)(1),
(2) Date: Apr. 20, 2023

(87) PCT Pub. No.: WO2022/083945
PCT Pub. Date: Apr. 28, 2022

(65) Prior Publication Data
US 2023/0302559 A1 Sep. 28, 2023

(30) Foreign Application Priority Data

Oct. 22, 2020 (DE) ..................... 10 2020 213 347.6
Mar. 8, 2021 (DE) ..................... 10 2021 202 211.1

(51) Int. Cl.
*B23G 1/22* (2006.01)
(52) U.S. Cl.
CPC ................................... *B23G 1/225* (2013.01)

(58) Field of Classification Search
CPC .... B23G 1/225; G05B 19/401; G05B 19/186; G05B 2219/31033; G05B 2219/40613; G05B 2219/45061; G01B 11/2425
See application file for complete search history.

(56) References Cited

U.S. PATENT DOCUMENTS 5,521,707 A * 5/1996 Castore .............. G01B 11/2425
356/602
2011/0164244 A1* 7/2011 Honda ................... G01B 5/163
356/72

(Continued)

FOREIGN PATENT DOCUMENTS

CN 101569979 A 11/2009
CN 101696621 A 4/2010

(Continued)

OTHER PUBLICATIONS

Alan Richter, "Automating thread inspection on tubular goods," Published Jan. 24, 2017, retrieved from https://www.ctemag.com/ articles/automating-thread-inspection-tubular-goods on Jun. 18, 2025.

(Continued)

*Primary Examiner* — Mong-Shune Chung
(74) *Attorney, Agent, or Firm* — Smartpat PLC

(57) ABSTRACT

A method for producing a thread on at least one end of at least one metal tube (3) by machining the metal tube (3) in at least one CNC-controlled machine tool (2) comprises an optical measurement of the thread during the thread-cutting process and/or following the thread-cutting process, and the electronic detection and evaluation of the measurement data of the thread profile and/or of a sealing lip (6) of the thread, and the derivation of control commands for controlling the machine tool (2) from the measurement data with use of at least one closed-loop control unit coupled to the machine tool (2). A corresponding thread-cutting facility is also disclosed.

19 Claims, 5 Drawing Sheets

(56) References Cited

U.S. PATENT DOCUMENTS

| | | | | |
|---|---|---|---|---|
| 2011/0251714 A1* | 10/2011 | Nishikawa | ............. | B23Q 17/22 |
| | | | | 700/174 |
| 2014/0226154 A1* | 8/2014 | Sakai | ........................ | B08B 1/34 |
| | | | | 356/237.1 |
| 2015/0292872 A1 | 10/2015 | Tripp et al. | | |
| 2019/0025794 A1* | 1/2019 | Matsumura | .......... | G05B 19/404 |
| 2019/0101889 A1 | 4/2019 | Riek et al. | | |
| 2019/0137264 A1* | 5/2019 | Sauerland | .......... | G01B 11/2425 |
| 2019/0235468 A1* | 8/2019 | Yeoman | ............... | G05B 19/402 |
| 2021/0041228 A1* | 2/2021 | Honda | ................ | G01B 11/2425 |
| 2022/0324044 A1* | 10/2022 | Liebald | .................... | B23G 1/16 |
| 2024/0183653 A1 | 6/2024 | Höfer et al. | | |
| 2024/0337481 A1 | 10/2024 | Sauerland et al. | | |

FOREIGN PATENT DOCUMENTS

| | | | | | |
|---|---|---|---|---|---|
| CN | 103235553 A | * | 8/2013 | ......... | G01N 21/9515 |
| CN | 108515352 A | | 9/2018 | | |
| CN | 110303492 A | | 10/2019 | | |
| DE | 102007017747 A1 | | 10/2008 | | |
| DE | 102009014766 B4 | | 2/2012 | | |
| EP | 2259015 A1 | | 12/2010 | | |
| EP | 2392896 A1 | | 12/2011 | | |
| EP | 2767799 A1 | | 8/2014 | | |
| EP | 2799809 A1 | | 11/2014 | | |
| EP | 2887010 A1 | | 6/2015 | | |
| EP | 3465079 | | 12/2017 | | |
| EP | 3465079 B1 | * | 10/2019 | ........... | B25J 19/021 |
| JP | S63191007 A | | 8/1988 | | |
| JP | H10142335 A | | 5/1998 | | |
| JP | 2003136332 A | | 5/2003 | | |
| JP | 2006526747 A | | 11/2006 | | |
| JP | 2010038554 A | | 2/2010 | | |
| JP | 2012161854 A | | 8/2012 | | |
| JP | 2016075502 A | | 5/2016 | | |
| JP | 2017030067 A | | 2/2017 | | |
| KR | 101368486 B1 | | 3/2014 | | |
| WO | 2012069154 A1 | | 5/2012 | | |
| WO | 2016000764 A1 | | 1/2016 | | |
| WO | 2019009371 A1 | | 1/2019 | | |
| WO | 2019090371 A1 | | 5/2019 | | |
| WO | WO-2020232041 A1 | * | 11/2020 | .......... | G01B 5/0004 |
| WO | 2021055736 A1 | | 3/2021 | | |

OTHER PUBLICATIONS

Peter Zelinski, Video: In-Process Scanning of a Turned Profile—via Robot, Published Oct. 22, 2010, text and images retrieved from https://www.mmsonline.com/videos/video-in-process-scanning-of-a-turned-profilevia-robot on Jun. 18, 2025.

Unknown author, "AGU CSA Certification," dated Jun. 24, 2015, retrieved from https://autonetics.com/agu-csa-certification/ on Jun. 18, 2025.

Unknown author, "Automated Thread Gauge," dated Dec. 28, 2018, retrieved from https://autonetics.com/projects/automated-thread-gauge/ on Jun. 18, 2025.

Unknown author, "Thread Gauging Systems," dated Oct. 23, 2011; retrieved from https://autonetics.com/thread-gauging-systems/ Jun. 18, 2025.

Unknown author, "AGU 4 Demonstration," dated Jul. 11, 2017, retrieved from https://autonetics.com/agu-4-demonstration/ on Jun. 18, 2025.

Unknown author, "Autonetics at Okuma Tech Show," dated Nov. 9, 2016, retrieved from https://autonetics.com/autonetics-at-okuma-tech-show/ on Jun. 18, 2025.

Unknown author, "Autonetics Stand-Alone Gauging Units (SGU)," dated Jan. 1, 2014, retrieved from https://autonetics.com/autonetics-stand-alone-gauging-units-sgu/ on Jun. 18, 2025.

Unknown author, "In-Process Inspection: Lathes," dated Sep. 28, 2016, retrieved from https://autonetics.com/in-process-inspection-lathes/ on Jun. 18, 2025.

Unknown author, "In-Process Non-Contact Robotic Gaging," dated Jul. 16, 2010, retrieved from https://autonetics.com/in-process-non-contact-robotic-gaging/ on Jun. 18, 2025.

Unknown author, "The V Series SGU," dated Sep. 2, 2014, retrieved from https://autonetics.com/the-v-series-sgu/ on Jun. 18, 2025.

Unkwown author, "Building Success in 2011," dated Jan. 3, 2011, retrieved from https://autonetics.com/building-success-in-2011/ Jun. 18, 2025.

User Manual, Automated Gauging Unit (AGU) Series 3.0, Release: 3.1.2 Date: May 10, 2015 , retrieved from http://autoneticsllc.com/images/PDF/Manual.pdf on Jun. 18, 2025.

Alan Richter, Automating thread inspection on tubular goods, Cutting Tool Engineering, Jan. 24, 2017, retrieved from https://www.ctemag.com/news/articles/automating-thread-inspection-tubular-goods on Mar. 20, 2023.

Falk Rosseler, Four questions about the TCG thread cutting machine for OCTG pipes, SMS Group magazine, Oct. 20, 2020, retrieved from https://www.sms-group.com/en-us/insights/all-insights/four-questions-about-the-tcg-thread-cutting-machine-for-octg-pipes on Mar. 20, 2023.

Frank D'Hone, ThreadView: Autonomous measuring system for OCTG threads and sealing lips, SM Group magazine, Mar. 11, 2020, retrieved from https://www.sms-group.com/insights/all-insights/threadview-autonomous-measuring-system-for-octg-threads-and-sealing-lips Mar. 20, 2023.

* cited by examiner

METHOD FOR PRODUCING A THREAD ON AT LEAST ONE END OF AT LEAST ONE METAL TUBE AND THREAD-CUTTING FACILITY

CROSS-REFERENCE TO RELATED APPLICATION

This application is a national stage application, filed under 35 U.S.C. § 371, of International Patent Application No. PCT/EP2021/075267, filed on 15 Sep. 2021, which claims the benefit of German Patent Applications No. 10 2020 213 347.6, filed 22 Oct. 2020 and No. 10 2021 202 211.1 filed 8 Mar. 2021.

TECHNICAL FIELD

The disclosure relates to a method for producing a thread on at least one end of at least one metal tube by machining the metal tube in at least one CNC-controlled machine tool, comprising an optical measurement of the thread during the thread-cutting process and/or following the thread-cutting process. The disclosure further relates to a thread-cutting facility for producing threads on the ends of metal tubes, and in particular for carrying out the method.

BACKGROUND

The threads of tubes used for transporting pressurized fluids, such as natural gas or crude oil, which are bolted together in a pressure-resistant, gas-tight and liquid-tight manner, are subject to stringent requirements for leak-tightness. With such OCTG (oil country tubular goods) tubes as casing tubes or riser tubes for oil or gas exploration wells or natural gas or oil production pipelines, conical threads with undercut thread flanks are typically used. A sealing lip is usually attached to the threads on the front side of the tube. Both the thread and the sealing lip must meet the highest precision requirements. In the prior art, in principle it is known to optically measure the threads for quality control of the tubes.

A method and a device for the optical measurement of the external thread profile of tubes is known, for example, from WO 2019/09371 A1. The device comprises a support for the tube to be measured and an optical measurement unit with at least one measuring device comprising a light source and a camera arranged in the beam path of the light source for recording a shadow image of the external thread profile, wherein the optical measurement unit is rigidly arranged on a support element that is held pivotally about three spatial axes, wherein furthermore the optical measurement unit has at least two measuring devices whose beam paths cross one another. The method comprises arranging the tubes to be measured on a support, such that the spatial axis runs transversely with respect to a measuring plane of the measurement unit and the external thread is arranged in the beam path between the light sources and the associated cameras, aligning the measurement unit in such a manner that the measuring plane encloses a right angle with the spatial axis, recording shadow images of the external thread by means of the camera of at least one measuring device, and evaluating the shadow images.

Another device for measuring a thread is known, for example, from EP 3 465 079 B1. The device comprises a holder for releasably holding a tube, wherein the thread is formed at one end of the tube, a first optical measuring section having a first optical sensor, wherein the first optical measuring section is mounted on a manipulator of the device, which is configured to move the first measuring section relative to the tube, and wherein the first optical measuring section is adjustable about a first adjustment axis relative to a thread axis of the thread, wherein a second optical measuring section of the device with a second optical sensor is arranged on the manipulator, wherein the optical measuring sections altogether form a measuring channel for simultaneous measurement of opposite sides of the thread. The device is characterized in particular by the fact that the measuring channel can be tilted by means of the manipulator about at least a second adjustment axis relative to the thread axis, such that the measuring channel can be freely aligned within a solid angle interval.

The measurement data obtained with the known devices and methods are usually detected on a random basis in order to derive findings from this with regard to the wear of the tools for cutting the threads. Moreover, the measurement results are used to record quality assurance data.

SUMMARY

The disclosure is based on the object of providing a method and a device for producing threads on metal tubes that are improved with regard to the feedback of measurement data from a quality check.

The object is achieved by a method as disclosed and claimed and by a thread-cutting facility as disclosed and claimed.

One aspect relates to a method for producing a thread on at least one end of at least one metal tube by machining the metal tube in at least one CNC-controlled machine tool, said method comprising an optical measurement of the thread during the thread-cutting process and/or following the thread-cutting process, and the electronic detection and evaluation of the measurement data of the thread profile and/or of a sealing lip of the thread, and the derivation of control commands for controlling the machine tool from the measurement data with use of at least one closed-loop control unit coupled to the machine tool.

The method expediently uses a preferably closed control loop between the machining of the metal tube and the thread measurement, wherein in an advantageous manner a direct evaluation and derivation of control commands for the machine tool on which the thread is or was cut takes place.

The closed-loop control unit provided, for example, in a machine controller for evaluating and deriving control commands can comprise at least one self-learning algorithm for deriving the control commands.

It is expedient to cut a conical external thread as the thread, which is to form a pressure-tight and/or liquid-tight connection with a complementary internal thread of a further metal tube.

The optical measurement of the thread can be carried out by means of at least one measuring head guided on a manipulator and having at least one optical measuring section.

The manipulator can, for example, be formed as an industrial robot with an articulated arm that has several degrees of freedom. At a free end of the manipulator, the measuring head can be arranged in such a manner that it can be freely aligned in space in at least three spatial axes. The measuring head can be arranged on a carrier and can be guided on the carrier so that it can be adjusted in several degrees of freedom relative to the carrier. The measuring head can, for example, be formed to be linearly adjustable relative to the carrier and/or can be tilted about at least one spatial axis.

An optical measuring section within the meaning of the present disclosure can be an optical detection system with an optical sensor by means of which an object can be optically measured. The optical measuring section can include at least one light source and a camera and/or a light section sensor. The optical measuring section can, for example, comprise telecentric optics with which an object-side parallel beam path is imaged on an optical sensor. With a preferred variant of the method, at least one measuring head is used, which is configured for the measurement of conical threads with undercut thread flanks. Such a measuring head can, for example, comprise a first and a second optical measuring section, which together form a measuring channel for simultaneous measurement of opposite sides of the thread. Such a measuring head is described, for example, in EP 3 465 079 B 1.

With a further preferred variant of the method, it is provided that the optical measurement of the thread is carried out following the thread-cutting process, preferably in a production line that is configured for the serial processing of a plurality of metal tubes, preferably several cycles after the thread-cutting process. The measurement can be carried out, for example, in a measurement station provided for this purpose, which is arranged in a process line downstream of the machine tool. For example, it can be provided to start the measurement on the second or third metal tube downstream of the machine tool in the process line, such that any corrections to the machine tool triggered by appropriate control commands are accompanied by the production of a relatively small number of scrap tubes.

The measurement station can be configured so that the metal tube to be measured can be fixed there in a defined position. This can be achieved, for example, by means of appropriate stops or receptacles in a base.

Alternatively, the method can also provide for the optical measurement of the thread to be carried out directly during the carrying out of the thread-cutting process (in situ), although this is associated with the disadvantage that the clocked manufacturing process must be interrupted when quality defects of the thread are detected.

With an expedient and preferred variant of the method, it is provided that the control commands are selected from a group of control commands that comprise a position correction of at least one tool relative to the metal tube to be machined in case of incorrect setting parameters or for wear compensation, the change of at least one tool due to wear, the selection of at least one tool due to predetermined geometric requirements on the thread profile, the adjustment of the speed and/or torque of a chuck of the machine tool and the change of the cycle time of the machine tool.

Control commands may be the following in particular:

Correction of tools due to geometric arrangement of cutting inserts of the tool, for example when a step is detected after tool change, Correction of tools due to wear, for example, when the cutting inserts of the tools start to smear, Correction of the tools due to other external influences, for example, when the ambient temperature changes, Correction of tools due to a change in the wall thickness of the tube to be machined or due to the use of a different material or material composition, as the case may be.

Control commands may be generated or derived, as the case may be, in particular from the following information derived from the measurement data:

Wear detection of the tools and a call for a tool change derived from this,

Wear detection of the tools for tool life optimization, for example to match cutting speed, cutting geometry and tool feed, Wear detection of the tools to generate tool life predictions.

The appropriate evaluation of the measurement data can increase the productivity of the machining or thread-cutting process, as the case may be, by optimizing the cycle time and improving the material flow. The method enables early problem detection. The collected data can further be used for quality evaluation and documentation and for downstream processes and correlated with the data of the machine tool, for example, by means of appropriate control algorithms or artificial intelligence. Downstream processes and correlations may be:

Detection of contamination of the metal tube and differentiation from machining defects, Correlation of the measured data with previously collected data, for example, in order to detect where stresses in the metal tube result from, which lead to an out-of-roundness of the metal tube after the thread-cutting process. From this, for example, an improvement in the ironing strategy can be derived, Increase in the quality by comparing the measurement results with the torque generated at the tool clamping, Increase in the quality by comparing the measurement results or measurement data, as the case may be, with the straightening forces occurring on a straightening machine.

The thread-cutting process is preferably performed on the metal tube clamped in a rotating chuck of the machine tool by means of at least one tool arranged to be stationary relative to the metal tube.

The method preferably comprises at least one method step during which a calibration of the measuring head is provided by means of at least one reference component arranged in a measurement station. The reference component can be provided, for example, as a gauge for the tube diameter of the metal tube.

Furthermore, it is possible to configure the thread to be cut in a software program and to compare the software data with the measured data as target data. For this purpose, for example, it can be additionally provided to use the data of a CAD system for the derivation of control commands.

With an expedient variant of the method, it is provided that the measurement data are stored in a quality database with a unique identification and assignment of the metal tube concerned, such that the quality data of the correspondingly identified metal tube can be retrieved at any time.

A preferred variant of the method is characterized by the method steps of fixing the metal tube to be measured in a defined measuring position within a measurement station, positioning the measuring head relative to the metal tube with a system for the position recognition of the measuring head, aligning the at least one measuring section with respect to a tube axis and traversing the thread profile and/or the sealing lip of the metal tube. The thread profile can be traversed, for example, by a linear movement and/or a rotary movement of the measuring head.

According to a further aspect, a thread-cutting facility is proposed for producing threads on the ends of metal tubes, which is intended and suitable in particular for carrying out the method described above. The thread-cutting facility comprises at least one CNC machine tool for machining the metal tube to be provided with threads, a control device for implementing control commands to the machine tool and at least one device for the optical measurement of the cut thread, means for the electronic detection and storage of the measurement data of the thread measurement and least one closed-loop control unit for deriving control commands from the measurement data of the thread measurement, wherein the device for the optical detection and storage of the measurement data is coupled to the control device of the machine tool.

The machine tool can be formed as a lathe, a turn-mill center, a thread-cutting machine or a sleeve-cutting machine.

The material machine expediently comprises at least one rotatable chuck for clamping the metal tube along with at least one tool holder that can be fixed and positioned relative to the chuck and has at least one tool. For example, the machine tool can comprise at least one, preferably a plurality of, tool holders formed as turret heads with a plurality of different tools.

The thread-cutting facility can comprise at least one machining station, and at least one measurement station arranged one behind the other in a process line, the machining station comprising the machine tool and the measurement station comprising at least one device for the optical measurement of the cut threads.

The thread-cutting facility can comprise as a device for optical measurement at least one measuring head with at least one optical measuring section, which is mounted on a manipulator, and which is configured to move the measuring head relative to the metal tube for the purpose of the measurement of the thread profile and/or a sealing lip of the thread.

The measuring head can include means for cleaning the thread to be measured, for example in the form of at least one brush, a brush system or at least one pneumatic or hydraulic cleaning device. If necessary, this ensures that any contamination of the thread, for example chips still adhering to the thread, is removed prior to measurement.

For example, a pneumatic cleaning device can include at least one compressed air ring that surrounds the thread in a cleaning stage. A plurality of spaced compressed air rings or alternatively compressed air bends with different diameters can be provided, either to be able to clean a conical thread or to be able to accomplish an adaptation to different thread diameters.

For this purpose, the cleaning device can be configured to rotate the thread to be cleaned relative to the cleaning device, or to rotate and/or move the cleaning device linearly about the thread to be cleaned.

For example, the cleaning device can comprise semi-circular arcs with inwardly directed compressed air nozzles, of which, for example, several are arranged one behind the other and/or at the same height relative to the longitudinal axis of the thread or metal tube, between which the thread is moved along the longitudinal axis and, if necessary, simultaneously rotated.

The invention is explained below by means of an example of an exemplary embodiment with reference to the accompanying drawings:

DETAILED DESCRIPTION

Figure 1:
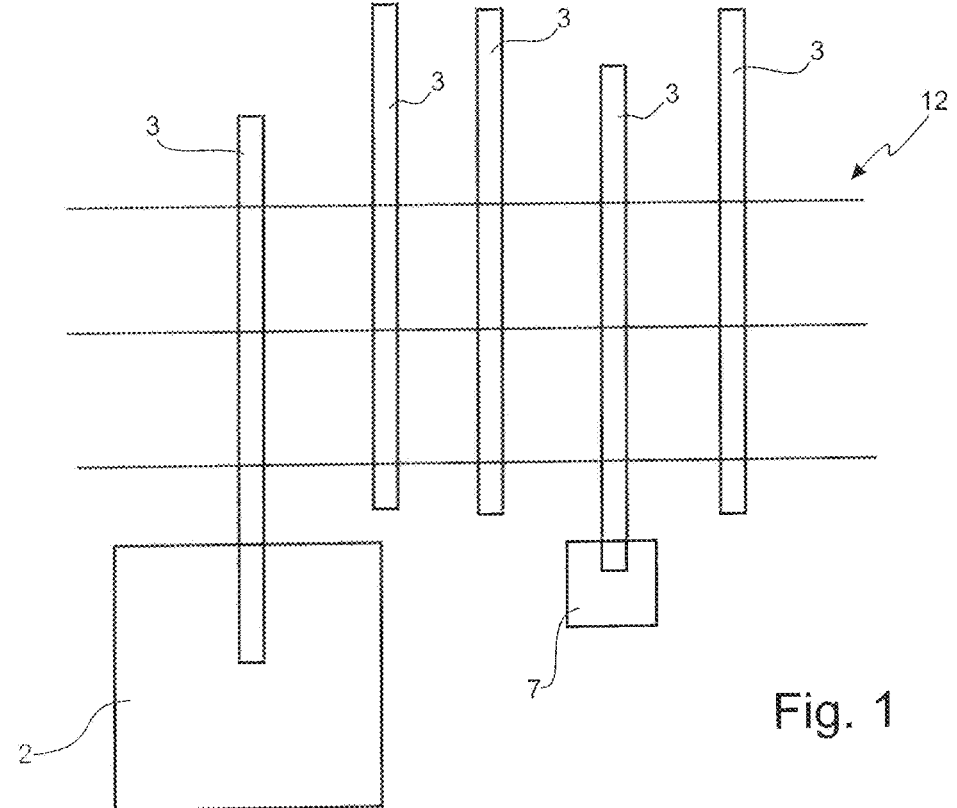
FIG. 1 shows a schematic view of the layout of a thread-cutting facility.
Figure 5:
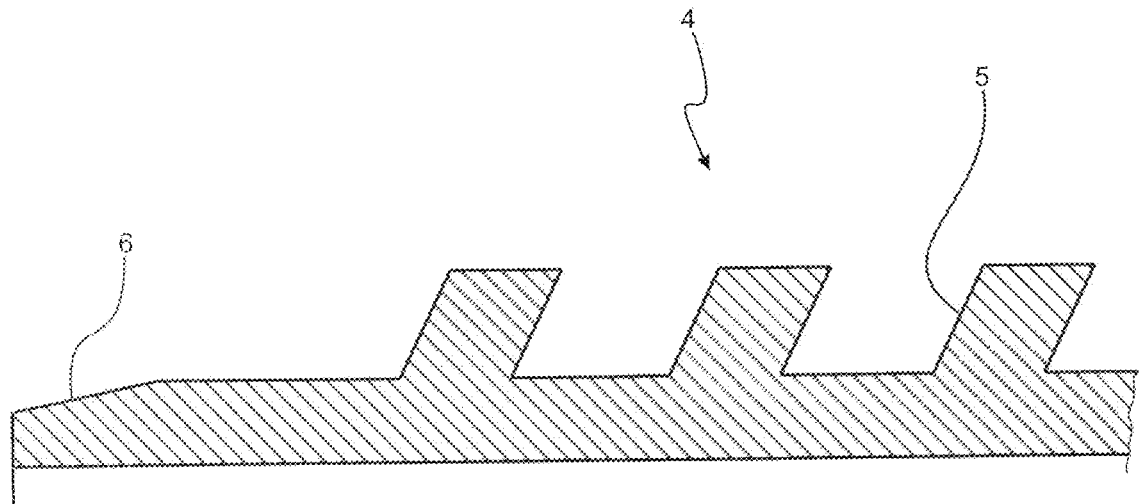

FIG. 1 shows the layout of a thread-cutting facility 1. The thread-cutting facility 1 comprises a machine tool 2 for machining an end of a metal tube 3, which may be formed, for example, as a casing tube or riser tube for a natural gas or petroleum production well. Such metal tubes 3 are screwed together to form pressure-resistant as well as liquid-tight and gas-tight connections, wherein the connection is made between an insertion end with an external thread 4 and a sleeve end with an internal thread. The method preferably relates to the production of the external thread 4 of such metal tubes. The metal tube 3 is provided in the machine tool 2 with a conical external thread 4, which may have undercut thread flanks 5 and a sealing lip 6 on the end face. FIG. 5 shows the external thread profile of a conical external thread 4 with undercut thread flanks 5 and a sealing lip 6 on the end face.

The metal tube 3 to be machined is initially clamped in a rotatable chuck of the machine tool 2. For the production of the thread, the machine tool 2 preferably comprises two tool turrets equipped with tools, each of which is arranged relative to the metal tube rotated by the chuck or rotated at machining speed, as the case may be, wherein the tools are each guided in a chip-removing manner in engagement with the end of the metal tube. The thread profile shown is the target profile stored in the controller of the machine tool 2. The method initially comprises the machining of metal tubes 3 in a process line and an optical measurement of the external threads 4 of the metal tubes 3 provided in the process line. As can be seen from the system layout shown in FIG. 1, a measurement station 7 is arranged in the process line downstream of the machine tool, which is formed as a CNC-controlled machine tool 2.

Figure 2:
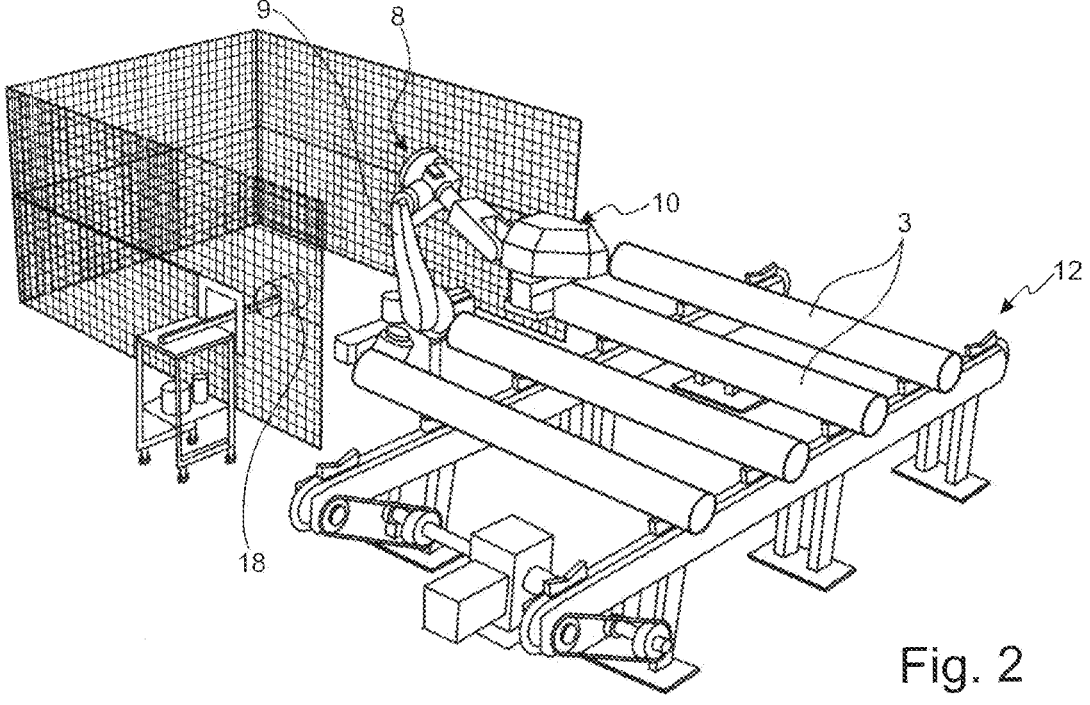
FIG. 2 shows a schematic perspective view of a measurement station of the thread-cutting facility.
Figure 3:
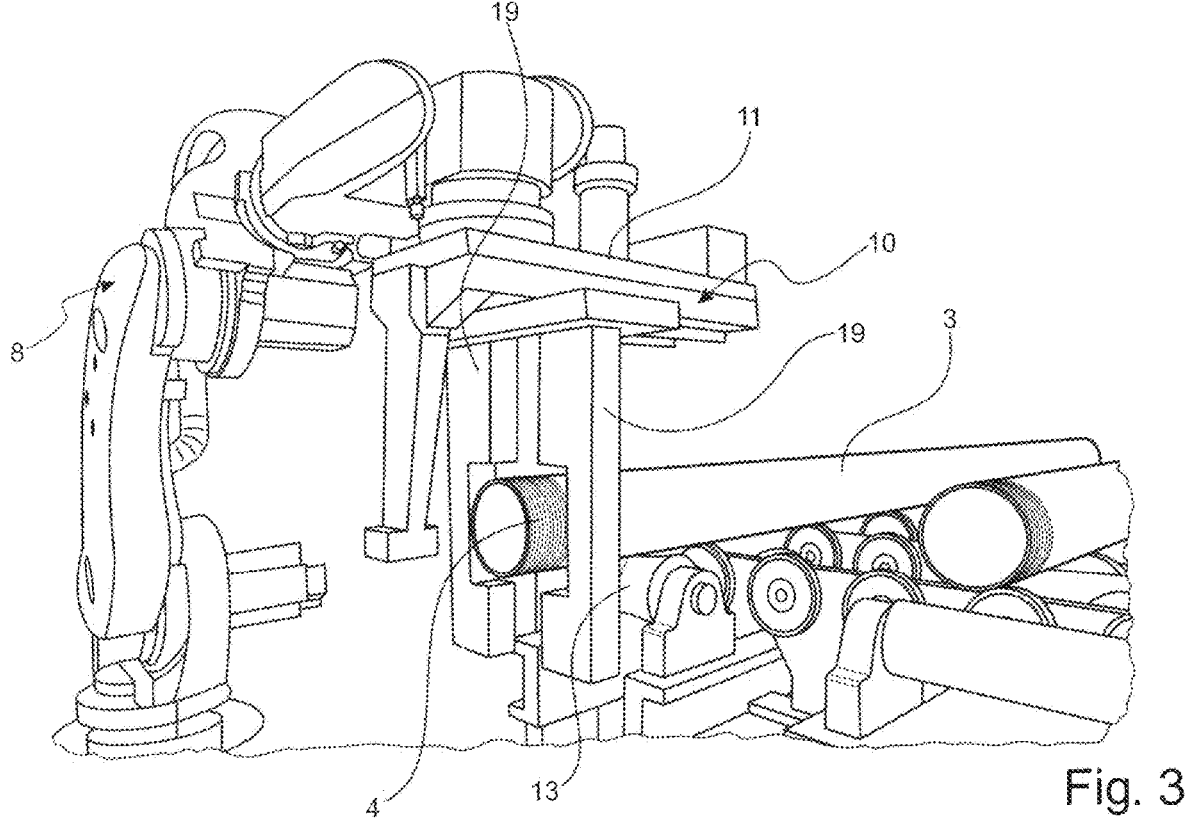
FIG. 3 shows a perspective view of the measuring head during thread measurement.

The measurement station 7 is schematically shown in FIG. 2. This comprises a robot 8, with a rotatable and pivotable robot arm 9 with preferably five degrees of freedom, at the free end of which a measuring head 10 is arranged. The measuring head 10 comprises a carrier 11 with optical measuring means provided thereon for the optical measurement of the external threads 4. After the thread-cutting process, the metal tubes 3 are fed to the measurement station 7 via a roller table 12 and fixed in a defined measuring position. The measuring position can be defined, for example, as shown schematically in FIG. 3, by a centrally constricted position roll (diabolo roll) 13, the constriction of which determines the position of the metal tube 3. Alternatively, a lateral stop can be provided to fix the position of the metal tube 3 to be measured. In the measuring position of the metal tube 3, the carrier 11 of the measuring head 10 is moved, if necessary after a diameter calibration of the metal tube 3, into a measuring position, in which the measuring head 10 is aligned relative to the metal tube 3.

The diameter calibration of the measuring head 10 serves to position the measuring means of the measuring head 10 relative to the carrier 11 in such a manner that the metal tube 3 is positioned between the measuring means that the measuring head 10 does not collide with the metal tube 3 during the pre-alignment. For this purpose, a gauge 18 is arranged in the measurement station 7 as a reference component, on the basis of which the measuring head 10 can be calibrated before the measurement process is carried out. At least one position sensor, for example as a laser section sensor, can be provided for positioning or pre-alignment, as the case may be, of the measuring head 10, with which the position of the measuring head 10 relative to the metal tube 3 fixed in the measuring position can be checked and corrected if necessary. The method can comprise both a pre-alignment of the measuring head 10 by a corresponding control of the robot arm 9 and a fine alignment of the measuring head 10 by adjusting the measuring head 10 relative to the carrier 11. The fine alignment comprises aligning at least one measuring section 16 with respect to a tube axis of the metal tube 3.

As mentioned above, the measuring head 10 is linearly movable relative to the carrier and preferably pivotable about at least one axis. The linear adjustment can be achieved, for example, by means of at least one driven recirculating ball screw or by means of at least one lantern pinion. The measuring means are each arranged in legs 19 of the measuring head 10. The legs 19 of the measuring head 10 are linearly adjustable in their distance relative to one another. The legs 19 of the measuring head 10 form a U-shaped enclosure of the metal tube 3. These can both be formed independently and adjustable relative to one another. With the described exemplary embodiment, it is provided that one leg 19 of the measuring head 10 is arranged in a stationary manner, whereas the other leg 19 of the measuring head 10 is adjustable relative to the opposite leg 19 of the measuring head 10.

Figures 4A, 4B, 4C:
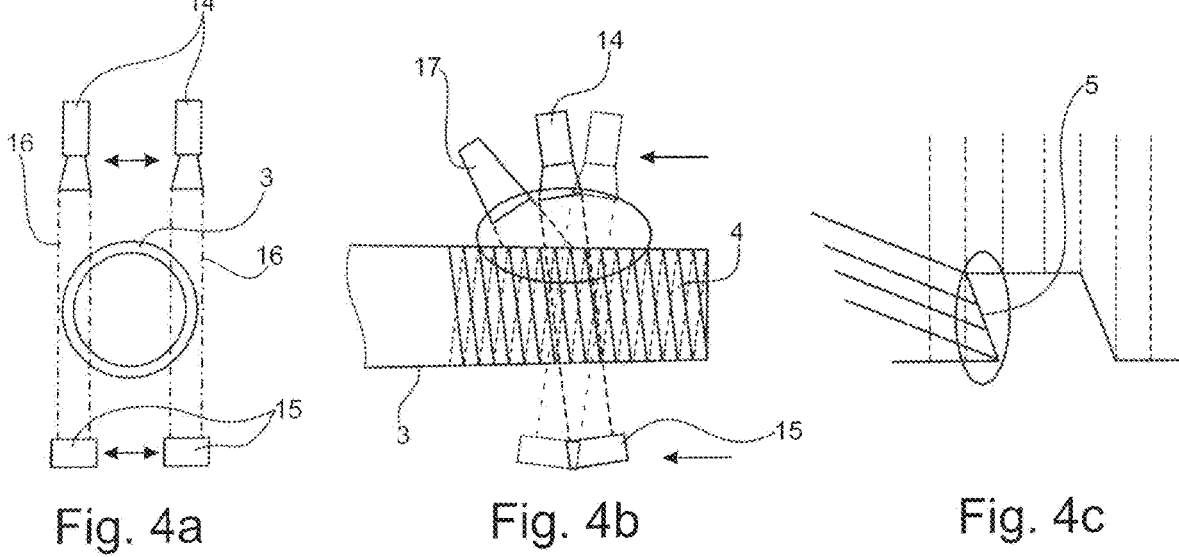
FIG. 4a shows an illustration of the optical measuring principle as a view in the direction of the longitudinal axis of the metal tube.
FIG. 4b shows a side view of the optical measuring principle with an additional light section sensor for the measurement of undercut thread flanks.
FIG. 4c shows a schematic illustration of the measuring principle for the measurement of undercut thread flanks and FIG. 5 is an illustration of the external thread profile of the metal tube.

In each of the legs 19 of the measuring head 10, a camera 14 with telecentric optics and a light source 15 positioned opposite the camera are provided as measuring means, as shown for example in FIG. 4*a*. The camera 14 and the light source 15 are each arranged opposite one another at a distance from one another, forming a measuring section 16, wherein the measuring section 16 can be formed as a straight measuring section 16. The beam path between the camera 14 and the light source 15 can alternatively be deflected via mirrors.

The measuring principle is explained below with reference to FIGS. 4*a*, 4*b* and 4*c*. Each measuring section 16 detects a part of the external thread profile on one side of the metal tube 3, wherein the projection of a part of the external thread 4, generated by a light source 15, appears by means of telecentric optics on a light-sensitive sensor, for example a CMOS or a CCD sensor, arranged in a camera 14. The use of telecentric lenses on the cameras 14 ensures that the projection detected by the respective sensor can be recorded undistorted and true to scale. The measured data of the external thread 4 detected in this manner are recorded and compared with the target profile of the external thread 4. The two measuring sections 16 may form a single measuring channel.

With one variant of the measuring head 10, it is provided that it comprises at least one light section sensor 17, which is formed as a laser section sensor, and which is aligned with a thread flank 5 of the external thread 4. The measurement of the thread flanks 5 is illustrated in FIG. 4*c*.

In a closed-loop control unit, which is not shown, the measured data of the external thread profile and/or the sealing lip 6 is evaluated, and control commands for controlling the machine tool 2 are derived, in particular in the case of a deviation between the target profile and the actual profile documented by the measured data. The respective target profile can, for example, be freely selectable in an operator interface (HMI) from a catalog of different thread types. The measuring head 10 and the controller of the machine tool 2 form a preferably closed control loop. Control commands may be, for example, the readjustment of the tool positions, the selection of the tools, the rotation speed and the torque that is thereby applied of the chuck of the machine tool 2 and of the metal tube 3, the carrying out of a tool change, the change of the cycle time of the machine tool 2, etc. As mentioned above, the closed-loop control system can be designed as a self-learning control system (AI) and comprise at least one control algorithm for this purpose. The measurement data determined with respect to a tube are used not only for feedback with the machine tool 2 and for its control, but also for quality data assurance and tracking.

With the method, it is preferably provided to carry out the optical measurement of the external threads 4 in the process line about three to four cycles downstream of the thread-cutting process.

LIST OF REFERENCE SIGNS

1 Thread-cutting facility
2 Machine tool
3 Metal tube
4 External thread
5 Thread flanks
6 Sealing lip
7 Measurement station
8 Robot
9 Robot arm
10 Measuring head
11 Carrier
12 Roller table
13 Position roll
14 Camera
15 Light source
16 Measuring section
17 Light section sensor
18 Gauge
19 Leg

The invention claimed is:

1. A method for producing a thread on an end of a metal tube (3) by machining the metal tube (3) in a CNC-controlled machine tool (2), the method comprising:

optically measuring the thread during a thread-cutting process and/or following the thread-cutting process;

electronically detecting and evaluating measurement data of a thread profile and/or of a sealing lip (6) of the thread; and deriving control commands for controlling the machine tool (2) from the measurement data by a closed-loop control unit coupled to the machine tool (2), wherein optically measuring the thread is performed by a measurement head with two opposing legs, each of the two opposing legs comprising a U-shaped frame arranged around the metal tube, with a camera and a light source positioned opposite the camera being arranged in each of the two opposing legs to form a respective measuring section across each U-shaped frame, wherein optically measuring of the thread is carried out following the thread-cutting process, in a production line that is configured for serial processing of a plurality of metal tubes (3) two or more cycles after the thread-cutting process.

2. The method according to claim 1, wherein the closed-loop control unit comprises a self-learning algorithm for deriving the control commands.

3. The method according to claim 1, wherein the thread is a conical external thread (4) suitable to form a pressure-resistant, gas-tight and/or liquid-tight connection with a complementary internal thread of a further metal tube (3).

4. The method according to claim 1, wherein optically measuring of the thread is carried out by a measuring head (10) guided on a manipulator and having an optical measuring section (16).

5. The method according to claim 4, wherein the measuring head (10) is configured for the measurement of conical threads with undercut thread flanks (5).

6. The method according to claim 4, further comprising calibrating the measuring head (10) by a reference component arranged in a measurement station (7).

7. The method according to claim 4, further comprising:

fixing the metal tube (3) in a defined measuring position within a measurement station, positioning the measuring head (10) relative to the metal tube (3) with a system for position recognition of the measuring head (10), aligning the measuring section (16) with respect to a tube axis, and traversing the thread profile and/or the sealing lip (6) of the metal tube (3).

8. The method according to claim 1, wherein the control commands are selected from the group consisting of a position correction of a tool relative to the metal tube to be machined in case of incorrect setting parameters or for wear compensation, a change of a tool due to wear, a selection of a tool due to predetermined geometric requirements on the thread profile, an adjustment of a speed and/or torque of a chuck of the machine tool (2), and a change of a cycle time of the machine tool (2).

9. The method according to claim 1, wherein the thread to be cut is configured in a software program by configuration data, and wherein the configuration data is compared with the measurement data.

10. The method according to claim 1, wherein the measurement data are stored in a quality database with a unique identification and assignment of the metal tube (3).

11. A thread-cutting facility for producing threads at ends of metal tubes, comprising:

a CNC machine tool (2) for machining a metal tube (3) to be provided with threads;

a control device for implementing control commands to the machine tool (2);

a device for optical measurement of the cut thread;

a closed-loop control unit for deriving control commands from measurement data generated by the device for optical measurement, wherein the device for the optical measurement is coupled to the control device, and wherein the device for the optical measurement includes a measurement head with two opposing legs, each of the two opposing legs comprising a U-shaped frame arranged around the metal tube, with a camera and a light source positioned opposite the camera being arranged in each of the two opposing legs to form a respective measuring section across each U-shaped frame, wherein the measuring head is linearly movable, by a recirculating ball screw or a lantern pinion, relative to a carrier and pivotable about at least one axis, and wherein a first of the two legs of the measuring head is stationary relative to the measuring head and a second of the two legs is adjustable relative to the first of the two legs.

12. The thread-cutting facility according to claim 11, wherein the machine tool (2) is a lathe, a turn-mill center, a thread-cutting machine, or a sleeve-cutting machine.

13. The thread-cutting facility according to claim 11, wherein the machine tool (2) comprises a rotatable chuck for clamping the metal tube (3) and a tool holder that can be fixed and positioned relative to the chuck and has a tool.

14. The thread-cutting facility according to claim 11, wherein a machining station and a measurement station (7) are arranged one behind the other in a process line, the machining station comprising the machine tool (2) and the measurement station (7) comprising the device for optical measurement of the cut thread.

15. The thread-cutting facility according to claim 11, wherein the device for the optical measurement is a measuring head (10) with an optical measuring section (16), which is mounted on a manipulator and which is configured to move the measuring head (10) relative to the metal tube (3) for measuring a thread profile and/or a sealing lip (6) of the thread.

16. The thread-cutting facility according to claim 15, wherein the measuring head (10) comprises means for cleaning the thread to be measured.

17. The thread-cutting facility according to claim 16, wherein the means for cleaning the thread is a cleaning device acting mechanically and/or with a cleaning fluid.

18. A thread-cutting facility for producing threads at ends of metal tubes, comprising:

a CNC machine tool (2) for machining a metal tube (3) to be provided with threads;

a control device for implementing control commands to the machine tool (2);

a device for optical measurement of the cut thread;

a closed-loop control unit for deriving control commands from measurement data generated by the device for optical measurement, wherein the device for the optical measurement is coupled to the control device, and wherein the device for the optical measurement includes a measurement head with two opposing legs, each of the two opposing legs comprising a U-shaped frame arranged around the metal tube, with a camera and a light source positioned opposite the camera
 being arranged in each of the two opposing legs to
 form a respective measuring section across each
 U-shaped frame, and wherein the measurement data used for deriving the
 control commands is obtained two or more cycles after
 machining the metal tube in the CNC machine tool.

19. The thread-cutting facility according to claim 11,
wherein the camera includes a telecentric optics.

<div align="center">* * * * *</div>